(12) United States Patent
Inoue

(10) Patent No.: US 7,609,314 B2
(45) Date of Patent: Oct. 27, 2009

(54) IMAGE PICKUP APPARATUS, METHOD OF CONTROLLING THE IMAGE PICKUP APPARATUS, AND CONTROL PROGRAM FOR IMPLEMENTING THE METHOD

(75) Inventor: Nobuyuki Inoue, Kawasaki (JP)

(73) Assignee: Canon Kabushiki Kaisha (JP)

( * ) Notice: Subject to any disclaimer, the term of this patent is extended or adjusted under 35 U.S.C. 154(b) by 297 days.

(21) Appl. No.: 11/835,386

(22) Filed: Aug. 7, 2007

(65) Prior Publication Data

US 2008/0036898 A1 Feb. 14, 2008

(30) Foreign Application Priority Data

Aug. 9, 2006 (JP) .............................. 2006-217457

(51) Int. Cl.
  G02B 13/16 (2006.01)
  H04N 5/225 (2006.01)
(52) U.S. Cl. ................... 348/335; 348/340; 348/372
(58) Field of Classification Search .............. 348/335, 348/373–375; 399/343–360; 15/104.001–245.1; 510/163–164
See application file for complete search history.

(56) References Cited

U.S. PATENT DOCUMENTS 6,940,554 B2 * 9/2005 Robins et al. ............... 348/335
7,339,623 B2 * 3/2008 Kawai ........................ 348/340
7,355,649 B2 * 4/2008 Takai ......................... 348/372
7,492,408 B2 * 2/2009 Ito ............................. 348/335

FOREIGN PATENT DOCUMENTS

JP 2002-204379 7/2002
JP 2003-330082 11/2003

* cited by examiner

Primary Examiner—Jason Chan
Assistant Examiner—Pritham Prabhakher
(74) Attorney, Agent, or Firm—Rossi, Kimms & McDowell LLP

(57) ABSTRACT

An image pickup apparatus which is capable of removing foreign substance, such as dust, attached to an optical member disposed in front of an image pickup element, even when accessories are exchanged in a power-off state of the image pickup apparatus. The type or state of an accessory mounted on the image pickup apparatus, which is detected immediately before a power-off of the image pickup apparatus are stored. When a type or state of a mounted accessory, which is detected immediately after the power-on, is different from the stored type or state of the accessory mounted on the image pickup apparatus, an operation for removing foreign substance attached to the optical member is carried out.

6 Claims, 8 Drawing Sheets

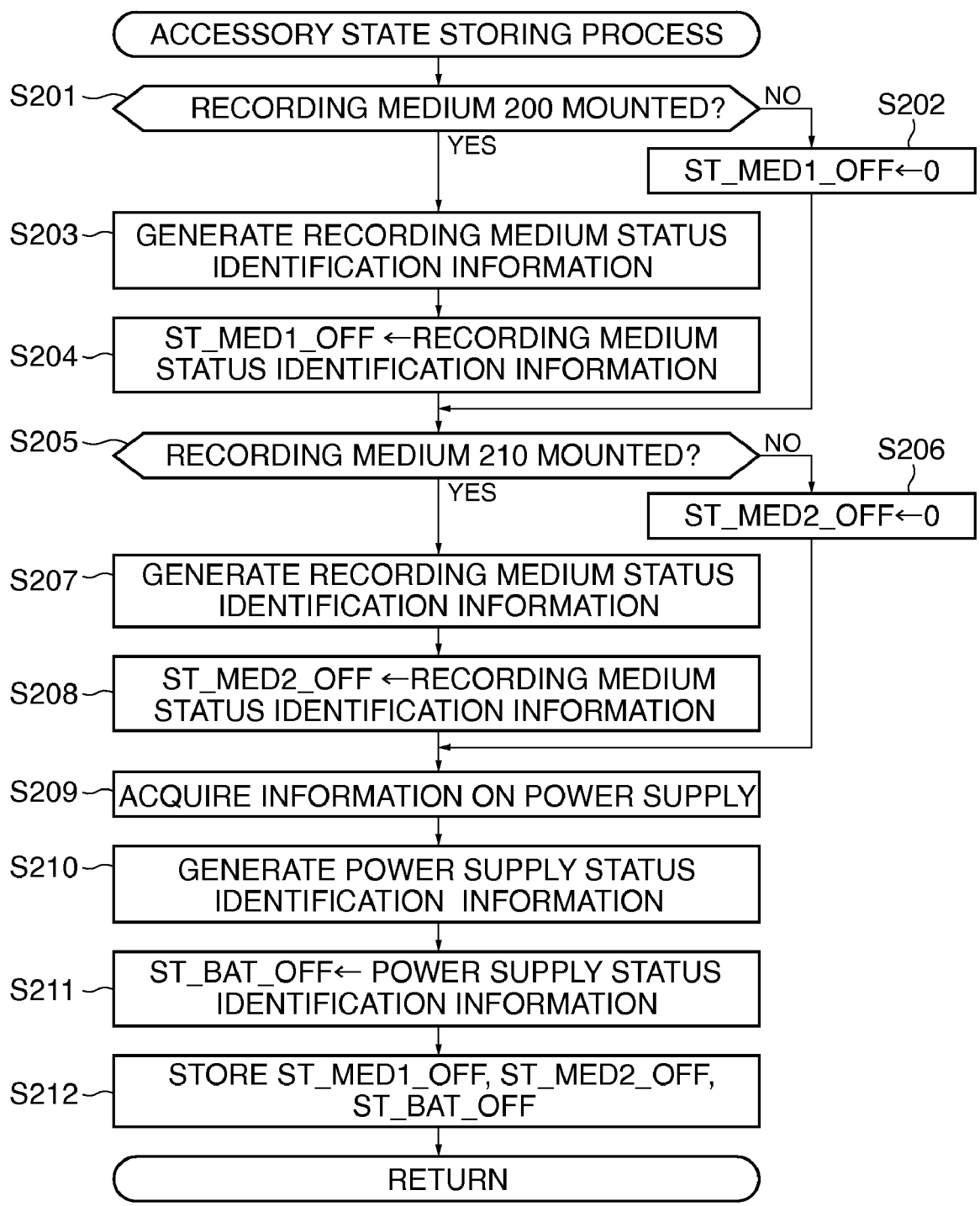

IMAGE PICKUP APPARATUS, METHOD OF CONTROLLING THE IMAGE PICKUP APPARATUS, AND CONTROL PROGRAM FOR IMPLEMENTING THE METHOD

BACKGROUND OF THE INVENTION

1. Field of the Invention

The present invention relates to an image pickup apparatus having a function of removing foreign substance attached to an optical member disposed in front of an image pickup element on a photographic optical axis, a method of controlling the image pickup apparatus, and a control program for implementing the method.

2. Description of the Related Art

A lens-exchangeable digital camera suffers from the possibility that dust or dirt floating in the air enters a camera body when an accessory, such as a lens, is removed from the camera body. Further, the camera body contains various mechanical units which are mechanically operated, such as a shutter mechanism, and operations of these mechanical units can cause generation of dust, such as metallic dust, in the camera body.

If the foreign substance, such as dust or dirt, is attached to the surface of an optical member constituting an image pickup unit of the digital camera, the image of the foreign substance is picked up as a shadow on a picked-up image, which causes degradation of quality of the picked-up image. On the other hand, in a camera using a silver salt film, whenever an image is picked up, the film is fed, and therefore it seldom occurs that the image of the same foreign substance continues to be picked up in the same position on an image. However, a digital camera in which such a film feeding operation is not performed suffers from a problem that the image of the same foreign substance is continuously picked up in the same position on a picked-up image.

To solve this problem, there has been proposed a digital camera in which a glass (dustproof glass) disposed between a photographic optical system and an image pickup element is vibrated to thereby shake dust attached to the glass off the glass (see e.g. Japanese Laid-Open Patent Publication (Kokai) No. 2002-204379).

Further, there has been proposed a camera that performs a dust-removing operation upon mounting of an accessory, as a means of removing dust that enters the body of the camera during mounting of the accessory and is attached to the surface of an optical member constituting an image pickup unit (see e.g. Japanese Laid-Open Patent Publication (Kokai) No. 2003-330082).

Irrespective of whether the camera is in a power-on state or in a power-off state, there is a possibility of carrying out exchange of accessories. Therefore, there is a high possibility that dust floating in the air or the like eventually enters the camera body during exchange operations of accessories. However, neither Japanese Laid-Open Patent Publication (Kokai) No. 2002-204379 nor Japanese Laid-Open Patent Publication (Kokai) No. 2003-330082 discloses a technique for coping with dust which can enter the camera body during exchanging of accessories in the power-off state of the camera or with a power battery removed from the camera.

SUMMARY OF THE INVENTION

The present invention provides an image pickup apparatus which is capable of removing foreign substance, such as dust, attached to an optical member disposed in front of an image pickup element, even when accessories are exchanged in a power-off state of the image pickup apparatus, a method of controlling the image pickup apparatus, and a control program for implementing the method.

In a first aspect of the present invention, there is provided an image pickup apparatus on which and from which an accessory device can be mounted and removed, comprising an optical member disposed in front of an image pickup element on a photographic optical axis, a foreign substance removing unit configured to remove foreign substance attached to the optical member, an accessory type/state-detecting unit configured to detect at least one of a type and a state of an accessory mounted on the image pickup apparatus, immediately before a power-off of the image pickup apparatus, and detect at least a corresponding one of a type and a state of an accessory mounted on the image pickup apparatus, immediately after a next power-on of the image pickup apparatus, a determining unit configured to determine whether the at least one of the type and the state of the accessory mounted on the image pickup apparatus, detected immediately before the power-off by the accessory type/state-detecting unit is identical to or different from the at least the corresponding one of the type and the state of the accessory mounted on the image pickup apparatus, detected immediately after the next power-on by the accessory type/state-detecting unit, and a control unit configured to cause the foreign substance removing unit to operate when the determining unit determines that the at least one of the type and the state of the accessory mounted on the image pickup apparatus, detected immediately before the power-off is different from the at least the corresponding one of the type and the state of the accessory mounted on the image pickup apparatus, detected immediately after the next power-on of the image pickup apparatus.

With the arrangement of the image pickup apparatus according to the first aspect of the present invention, when it is determined that at least one of the type and the state of an accessory mounted on the image pickup apparatus, which is detected immediately before a power-off of the image pickup apparatus is different from that of an accessory mounted on the image pickup apparatus, which is detected immediately after a next power-on of the image pickup apparatus, the foreign substance removing unit is operated. Therefore, even when exchange of accessories is performed in the power-off state of the image pickup apparatus, it is possible to remove foreign substance, such as dust, attached to the optical member disposed in front of the image pickup element.

The image pickup apparatus can further comprise a storage unit configured to store information on at least one of the type and the state of the accessory mounted on the image pickup apparatus, detected immediately before the power-off.

The accessory can be is at least one of an exchangeable photographic lens, an image storing medium for recording a picked-up electronic image, and a power supply.

In a second aspect of the present invention, there is provided a method of controlling an image pickup apparatus on which and from which an accessory device can be mounted and removed, the image pickup apparatus including an optical member disposed in front of an image pickup element on a photographic optical axis, and a foreign substance removing unit configured to remove foreign substance attached to the optical member, comprising an accessory type/state-detecting step of detecting at least one of a type and a state of an accessory mounted on the image pickup apparatus, immediately before a power-off of the image pickup apparatus, and detecting at least a corresponding one of a type and a state of an accessory mounted on the image pickup apparatus, immediately after a next power-on of the image pickup apparatus, a determination step of determining whether the at least one of the type and the state of the accessory mounted on the image pickup apparatus, detected immediately before the preceding power-off in the accessory type/state-detecting step is identical to or different from the at least the corresponding one of the type and the state of the accessory mounted on the image pickup apparatus, detected immediately after the next power-on in the accessory type/state-detecting step, and a control step of causing the foreign substance removing unit to operate when it is determined in the determination step that the at least one of the type and the state of the accessory mounted on the image pickup apparatus, detected immediately before the power-off is different from the at least the corresponding one of the type and the state of the accessory mounted on the image pickup apparatus, detected immediately after the next power-on of the image pickup apparatus.

In a third aspect of the present invention, there is provided a control program for causing a computer to execute a method of controlling an image pickup apparatus on which and from which an accessory device can be mounted and removed, the image pickup apparatus including an optical member disposed in front of an image pickup element on a photographic optical axis, and a foreign substance removing unit configured to remove foreign substance attached to the optical member, comprising an accessory type/state-detecting module for detecting at least one of a type and a state of an accessory mounted on the image pickup apparatus, immediately before a power-off of the image pickup apparatus, and detecting at least a corresponding one of a type and a state of an accessory mounted on the image pickup apparatus, immediately after a next power-on of the image pickup apparatus, a determination module for determining whether the at least one of the type and the state of the accessory mounted on the image pickup apparatus, detected immediately before the power-off by the accessory type/state-detecting module is identical to or different from the at least the corresponding one of the type and the state of the accessory mounted on the image pickup apparatus, detected immediately after the next power-on by the accessory type/state-detecting module, and a control module for causing the foreign substance removing unit to operate when the determination module determines that the at least one of the type and the state of the accessory mounted on the image pickup apparatus, detected immediately before the power-off is different from the at least the corresponding one of the type and the state of the accessory mounted on the image pickup apparatus, detected immediately after the next power-on of the image pickup apparatus.

The above and other objects, features, and advantages of the invention will become more apparent from the following detailed description taken in conjunction with the accompanying drawings.

BRIEF DESCRIPTION OF THE DRAWINGS

FIG. 4 is a flowchart of an accessory state storing process.

DETAILED DESCRIPTION OF THE PREFERRED EMBODIMENTS

The present invention will now be described in detail with reference to the drawings showing a preferred embodiment thereof.

Figure 1:
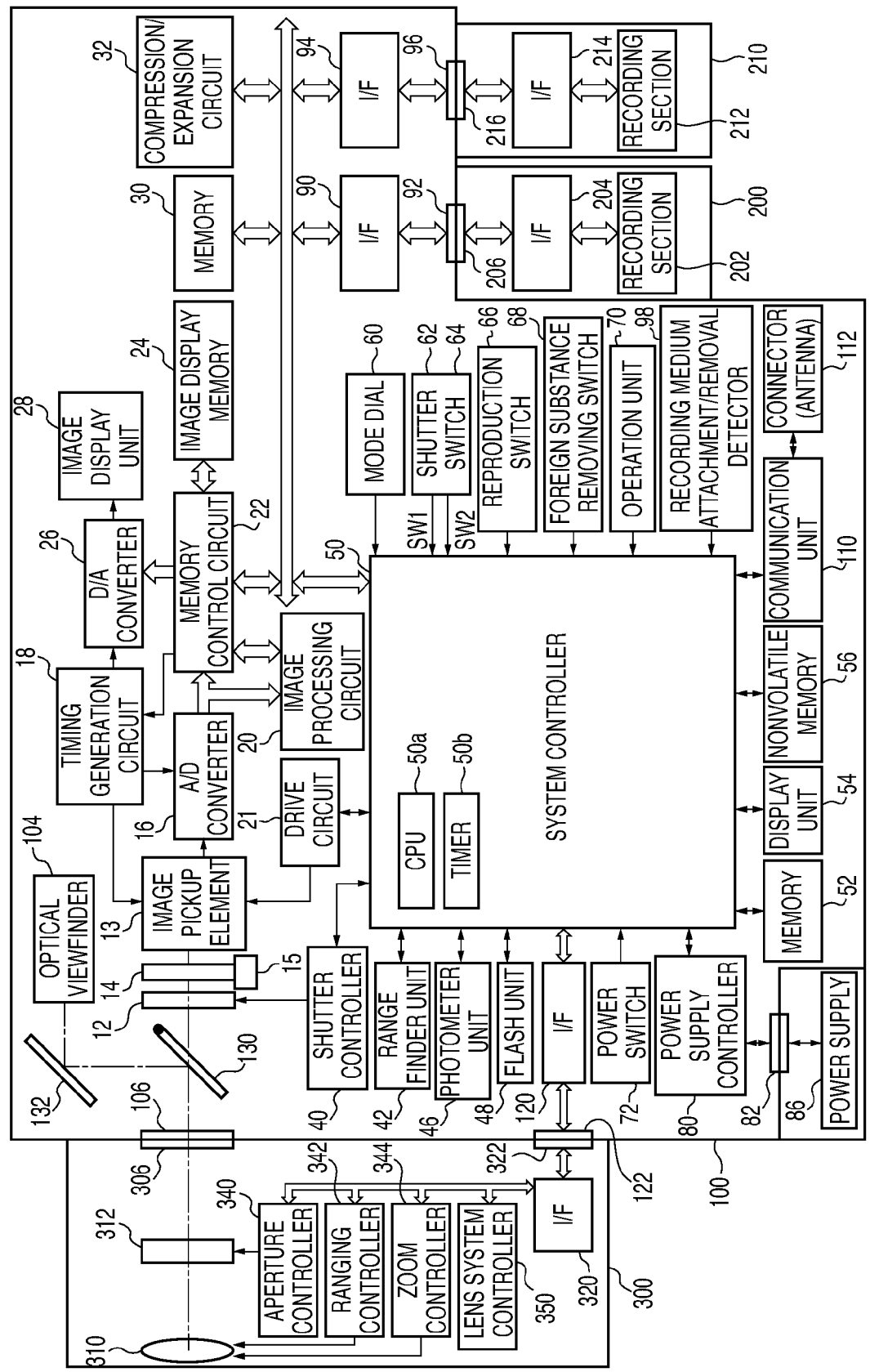
FIG. 1 is a functional block diagram of a digital single-lens reflex image pickup apparatus according to an embodiment of the present invention.

FIG. 1 is a functional block diagram of a digital single-lens reflex image pickup apparatus (hereinafter simply referred to as "the camera") 100 according to the embodiment of the present invention. It should be noted that the image pickup apparatus of the present invention is not limited to a digital single-lens reflex camera, but the present invention can also be applied to a digital video camera, a camera incorporated in a cellular phone, and the like image pickup apparatuses, each of which exchange of accessories, such as a photographic lens, can cause attachment of foreign substance to an optical member disposed in the vicinity of an image pickup element.

Referring to FIG. 1, reference numeral 13 designates an image pickup element that converts an optical image to an electric signal, and reference numeral 12 designates a shutter for controlling exposure to the image pickup element 13. Reference numeral 14 designates an optical member disposed in front of the photoelectric conversion surface of the image pickup element 13 on a photographic optical axis and provided with a function of preventing attachment of foreign substance to the photoelectric conversion surface. The optical member 14 functions as a dustproof filter for the image pickup element 13 (which will be described in detail hereinafter). Reference numeral 15 designates a vibration member disposed adjacent to the optical member 14, for providing a predetermined vibration to the optical member 14. The vibration member 15 is implemented e.g. by a piezoelectric element. Reference numeral 21 designates a drive circuit for driving the piezoelectric element. The drive circuit 21 is operated by an instruction from a system controller 50.

A ray of light incident through a photographic lens 310 is guided via an aperture 312, a lens mount 306, a camera mount 106, a mirror 130, and the shutter 12 by the single-lens reflex method to form an optical image on the image pickup element 13. Reference numeral 16 designates an A/D converter for converting an analog signal output from the image pickup element 13 and subjected to photoelectric conversion to a digital signal. A timing generation circuit 18 supplies a clock signal and a control signal to the image pickup element 13, the A/D converter 16, and a D/A converter 26. The timing generation circuit 18 is controlled by a memory control circuit 22 and the system controller 50.

An image processing circuit 20 performs predetermined pixel interpolation and color conversion on data output from the A/D converter 16 or the memory control circuit 22. Further, the image processing circuit 20 carries out predetermined computations using picked-up image data, as required. The system controller 50 executes TTL (Through-The-Lens) AF (Auto Focus) processing, AE (Auto Exposure) processing, and EF (electronic flash pre-emission) processing for a shutter controller 40 and a range finder unit 42, based on computation results obtained by the computations. Further, the image processing circuit 20 carries out predetermined computations using picked-up image data and performs AWB (Auto White Balance) processing based on computation results obtained by the computations.

It should be noted that in the present embodiment, the camera 100 is equipped with the range finder unit 42 and a photometer unit 46. With this arrangement, it is possible to perform the AF processing, the AE processing, and the EF processing using the range finder unit 42 and the photometer unit 46 instead of using the image processing circuit 20. Further, the above-described arrangement makes it possible to perform the AF processing, the AE processing, and the EF processing using the range finder unit 42 and the photometer unit 46, and then further carry out the AF processing, the AE processing, and the EF processing using the image processing circuit 20.

The memory control circuit 22 controls the A/D converter 16, the timing generation circuit 18, the image processing circuit 20, an image display memory 24, the D/A converter 26, a memory 30, and a compression/expansion circuit 32. Digital data output from the A/D converter 16 is written into the image display memory 24 or the memory 30 via the image processing circuit 20 and the memory control circuit 22, or directly via the memory control circuit 22.

Reference numeral 28 designates an image display unit including a TFT LCD. The image data written into the image display memory 24 for display is displayed on the image display unit 28 via the D/A converter 26. The memory 30 stores picked-up still image data, and has a sufficiently large storage capacity for storing a predetermined number of still images. This large storage capacity enables high-speed writing of a large amount of image data into the memory 30 in continuous shooting in which a plurality of still images are consecutively photographed. Further, the memory 30 can also be used as a work area for the system controller 50.

The compression/expansion circuit 32 compresses or expands image data by adaptive discrete cosine transformation (ADCT) or the like. The compression/expansion circuit 32 reads image data stored in the memory 30 and performs compression or expansion processing on the read image data, and writes the processed data into the memory 30. The shutter controller 40 controls the shutter 12 based on photometry information from the photometer unit 46 in cooperation with an aperture controller 340 which controls the aperture 312. The range finder unit 42 performs the AF (auto-focus) processing.

A ray of light incident through the photographic lens 310 is directed to the range finder unit 42, whereby an in-focus state of an image formed as an optical image is measured. The photometer unit 46 performs the AE processing, while a ray of light incident upon the lens 310 is directed to the photometry unit 46, whereby the exposure state of the optical image is measured. Further, the photometer unit 46 can also have an EF processing function through cooperation with a flash unit 48. The flash unit 48 also has an AF auxiliary light-projecting function and an electronic flash pre-emission function. AF control can also be performed by using both the results of measurement by the range finder unit 42 and the results of calculation performed by the image processing circuit 20 based on the image data of an image picked up by the image pickup element 13. Exposure control as well can be performed by using both the results of measurement by the photometer unit 46 and the results of calculation performed by the image processing circuit 20 based on the image data of an image picked up by the image pickup element 13.

The system controller 50 includes a CPU 50a implemented e.g. by a microcomputer, and a timer 50b configured to count a time period according to an instruction from the CPU 50a, and controls the overall operation of the camera 100. A memory 52 stores constants and variables for use in operation of the system controller 50, programs to be executed by the CPU 50a, and so forth.

A display unit 54 includes a liquid crystal display device, a speaker, etc., for displaying the operating state of the camera 100 and messages, using characters, images, voices, and so forth, in accordance with execution of programs by the system controller 50. These devices are provided at a single or a plurality of locations close to an operation unit of the camera 100, where the devices are easily viewable. The display unit 54 is implemented e.g. by a combination of an LCD, LEDs, sounding elements, etc.

Further, part of the display functions of the display unit 54 is provided in an optical viewfinder 104. Among the contents to be displayed by the display unit 54, those displayed on the LCD or the like include a single shot/continuous shot display, a self-timer display, a compression ratio display, a display indicating the number of recorded pixels, a display indicating the number of recorded shots, a display indicating the number of remaining shots, a shutter speed display, an aperture value display, an exposure correction display, a flash display, a red-eye reduction display, a beep setting display, a remaining battery power display, an error display, a display indicating information by a plurality of digits, and a display indicating an attached/removed state of storage media 200 and 210. In addition, a display indicating a mounted/removed state of a photographic lens unit 300, a communication I/F operation display, a date and time display, a display indicating a state of connection to an external computer, etc. are also displayed on the LCD or the like.

Further, among the contents to be displayed by the display unit 54, those provided in the optical viewfinder 104 include, by way of example, a focusing display, a shooting-ready display, a camera shake warning display, a flash charging display, a flash charged display, a shutter speed display, a aperture value display, an exposure correction display, and a display indicating a write operation to a recording medium.

Furthermore, among the contents to be displayed by the display unit 54, those displayed on the LED or the like also include a display indicating a write operation to a recording medium, for example. The display unit 54 displays some of the contents using a lamp or the like. The lamp includes a self timer notification lamp, for example. The self timer notification lamp can also be used as an AF auxiliary light.

A nonvolatile memory 56 stores data in an electrically erasable and recordable manner. The nonvolatile memory 56 is configured to be capable of holding stored information even in the power-off state, and is implemented e.g. by an EEPROM. Reference numerals 60, 62, 64, 66, 68, and 70 designate operation devices for inputting various operation instructions to the system controller 50. Each of them is comprised of a single switch or dial or the like element, or a combination of a plurality of switches, dials, and/or the like.

Next, a description will be given of these operation devices.

A mode dial switch 60 is capable of selectively setting one of various functional shooting modes, such as an automatic mode, a program mode, a shutter-speed priority mode, an aperture priority mode, a manual mode, and a focus-depth priority mode. Further, the functional shooting modes include a portrait mode, a landscape mode, a close-up mode, a sports mode, a night-view mode, and a panorama mode.

The shutter switch (SW1) 62 is turned on when a shutter button is half operated, to give an instruction for starting the AF processing, the AE processing, and the like processing. The shutter switch (SW2) 64 is turned on when the shutter button is fully operated, whereby an exposure operation is carried out.

Further, a signal read out from the image pickup element 13 is written into the memory 30 as image data via the A/D converter 16 and the memory control circuit 22. Furthermore, when the shutter switch (SW2) 64 is turned on, an instruction is given for starting a sequence of processing operations including exposure processing, development processing performed using calculations by the image processing circuit 20 and the memory controller 22, reading out of the image data from the memory 30, compression of the image data by the compression/expansion circuit 32, and writing of the compressed image data into the recording medium 200 or 210. In a shooting mode, when the reproduction switch 66 is operated, an instruction is given for starting a reproduction operation for reading out the picked-up image from the memory 30 or the recording medium 200 or 210 and then displaying the read-out image on the image display unit 28. The foreign substance removing switch 68 is operated to give an instruction for starting a foreign substance detecting operation.

The operation unit 70 includes various kinds of buttons and dials, and a touch panel, and carries out operations mentioned below, by way of example.

The operation unit 70 is capable of performing a menu operation, image reproduction, flash setting, switching between the single-shot mode, the continuous shooting mode, and the self-timer mode, selection of an image for reproduction, selection of an image size for recording, exposure correction, date and time setting, and setting of ON/OFF of the image display unit 28. Further, the operation unit 70 is capable of setting a quick review function for automatically reproducing image data picked up immediately after shooting, and a compression mode for selecting between a compression rate of JPEG compression and a RAW mode in which a signal from the image pickup element is digitized and recorded in a recording medium without compression. Furthermore, the operation unit 70 is capable of setting various functional modes, such as a reproduction mode, a multi-screen reproduction/deletion mode, and a PC connection mode.

The operation unit 70 is also capable of setting an AF mode for selecting between a one-shot AF mode and a servo AF mode. In the one-shot AF mode, when the shutter switch (SW1) 62 is pressed, an autofocus operation is started, and once focus is achieved, the in-focus state is maintained. In the servo AF mode, an autofocus operation is continuously performed while the shutter switch (SW1) 62 is kept pressed.

A power switch 72 is capable of switching the camera 100 between the power-on state and the power-on state. The power switch 72 is capable of switching various accessories, such as the photographic lens unit 300, an external strobe unit, and the recording media 200 and 210, each connected to the camera 100, between the power-on state and the power-off state in accordance with the switching of the camera 100 between the power-on state and the power-on state. A power supply controller 80 includes a battery detection circuit, a DC-DC converter, and a switch circuit for switching between blocks to be supplied with electric power. The power supply controller 80 detects whether or not a battery is mounted, the type of the battery, and the remaining capacity of the battery, controls the DC-DC converter based on the results of the detection and instructions from the system controller 50, and supplies a necessary voltage to each component just over a required time period.

Reference numeral 82 designates a connector connecting between the power supply controller 80 and a power supply 86 which is comprised of a primary battery, such as an alkali battery or a lithium battery, a secondary battery such as an NiCd battery or an Li battery, or an AC adapter.

Reference numerals 90 and 94 designate interface devices which interface between the camera 100 and recording media, such as a memory card and a hard disk, and reference numerals 92 and 96 designate connectors for connection to the respective recording media. A recording medium attachment/removal detector 98 detects whether or not the recording medium 200 (210) is attached to the connector 92 (96). In the present embodiment, the camera 100 is provided with two sets of an interface and a connector for attachment of the recording medium, but it is to be understood that the camera 100 may be provided with either one set of an interface and a connector or a plurality of sets thereof. Interfaces and connecters compliant with different standards may be used in combination.

The interface and the connector can be implemented by ones compliant with the PCMCIA card standard or the CF (compact flash (registered trademark)) card standard. When the interfaces 90 and 94 and the connectors 92 and 96 are implemented by ones compliant with the PCMCIA card standard or the CF card standard, it is possible to connect various types of communication cards, such as a LAN card, a modem card, a USB card, an IEEE 1394 card, an SCSI card, and a PHS card, to the camera 100. With this configuration, the camera 100 can exchange image data and management information attached to the image data with a computer or a peripheral device, such as a printer.

A ray of light incident upon the lens 310 is guided by the optical viewfinder 104 through the aperture 312, the lens mount 306, the camera mount 106, and the mirrors 130 and 132 to form an optical image. This makes it possible to perform a shooting operation using only the optical viewfinder 104 without using the electronic finder function of the image display unit 28.

Reference numeral 110 designates a communication unit with communication functions based on the RS232C, USB, IEEE 1394, SCSI, modem, LAN, wireless communication and so forth. The communication functions enable the camera 100 to exchange image data and management information attached to the image data with a computer or a peripheral device, such as a printer. Reference numeral 112 designates a connector for connecting the camera 100 to other devices via the communication unit 110, or an antenna in the case of wireless communication.

The camera 100 and the photographic lens unit 300 are connected to each other via an interface 120, and a connector 122 electrically connects the camera 100 to the photographic lens unit 300. A lens mounting/removal detector, not shown, detects whether or not the photographic lens unit 300 is mounted to the lens mount 106 and (or) the connector 122. The connector 122 has not only a function of transmitting a control signal, a state signal, and a data signal between the camera 100 and the photographic lens unit 300, but also a function of supplying electric currents at various voltages. The connector 122 may be configured to also enable optical communication, audio communication, and the like, in addition to electrical communication.

The recording medium 200, such as a memory card or a hard disk, is comprised of a recording section 202 implemented by a semiconductor memory, a magnetic disk, or the like, an interface 204 for providing interface with the camera 100, and a connector 206 for connection to the camera 100. Similarly, the recording medium 210, such as a memory card or a hard disk, is comprised of a recording section 212 implemented by a semiconductor memory, a magnetic disk, or the like, an interface 214 for providing interface with the camera 100, and a connector 216 for connection to the camera 100.

The photographic lens unit 300 of a lens-exchangeable type is connected to the camera 100 via an interface 320. Further, the photographic lens unit 300 is electrically connected to the camera 100 via a connector 322. The connector 322 has not only a function of transmitting a control signal, a state signal, and a data signal between the camera 100 and the photographic lens unit 300, but also a function of being supplied with electric currents at various voltages or supplying electric currents at various voltages. The connector 322 may be configured to also enable optical communication, audio communication, and the like, in addition to electrical communication. An aperture controller 340 controls an aperture 312 in cooperation with the shutter controller 40 that controls the shutter 12 based on photometry information from the photometer unit 46. A ranging controller 342 controls focusing of the photographic lens 310, and a zoom controller 344 controls zooming of the photographic lens 310.

Further, a lens system controller 350 controls the overall operation of the lens unit 300. The lens system controller 350 is provided with a memory for storing constants, variables, and programs for operations, as well as a memory for storing identification information, such as a number unique to the lens unit 300, management information, function data including a wide open aperture value, a minimum aperture value, and a focal length. The lens system controller 350 is also provided with a nonvolatile memory for storing present or past set values, and so forth.

During execution of a foreign substance removing operation, the optical member 14 is vibrated by the vibration member 15, whereby dust and dirt is shaken off the surface of the optical member 14. In the present embodiment, foreign substance is removed by vibrating the optical member 14, but a repetition period at which a voltage is applied to the vibration member (piezoelectric element) 15 and a direction in which the optical member 14 is vibrated are not particularly limited. Further, vibration to be generated may be either primary vibration or high order vibration.

Furthermore, a foreign substance removing method according to the present invention is not limited to a method according to the present embodiment, described hereinafter, but different methods can be employed.

Figure 2:
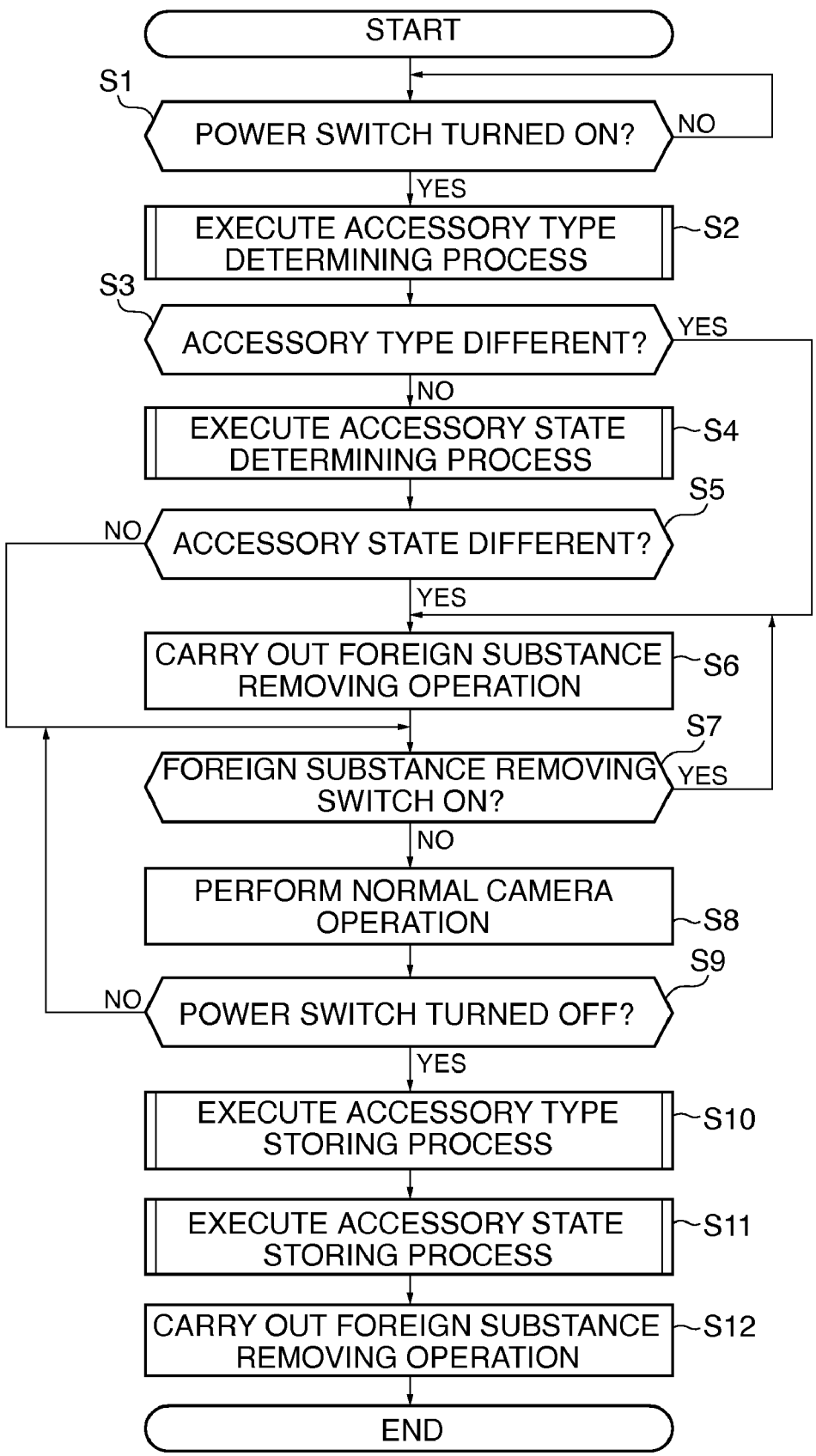
FIG. 2 is a flowchart of a foreign substance removing process.

FIG. 2 is a flowchart of a foreign substance removing process carried out in the camera 100 according to the present invention. This process is executed by the system controller 50.

First, when the power of the camera 100 is turned on in a step S1, the process proceeds to a step S2.

In the step S2, an accessory type determining process is executed so as to determine whether or not an accessory currently mounted on the camera 100 is different from an accessory having been mounted immediately before the preceding power-off. If it is determined in the accessory type determining process that the currently mounted accessory is different from the accessory having been mounted immediately before the preceding power-off, a control flag F_ACC_ID is set to a value other than 0. On the other hand, if it is determined that the currently mounted accessory is the same as the accessory having been mounted immediately before the preceding power-off, the control flag F_ACC_ID is set to 0. Accessories to be subjected to type determination and details of a sequence of determination processing will be described hereinafter. When the process in the step S2 is completed, the present process proceeds to a step S3.

It is determined in the step S3 whether or not that the control flag F_ACC_ID has been set to a value other than 0 as a result of the determination processing in the step S2, and if it is determined that the control flag F_ACC_ID has been set to a value other than 0, which means that the currently mounted accessory is different from the accessory having been mounted immediately before the preceding power-off, the present process proceeds to a step S6. On the other hand, if it is determined that the currently mounted accessory is the same as the accessory having been mounted immediately before the preceding power-off, the present process proceeds to a step S4.

In the step S4, an accessory state determining process is executed so as to determine whether or not the state of the currently mounted accessory has changed from that detected immediately before the preceding power-off.

If it is determined in the step S4 that the state of the currently mounted accessory has not changed, a control flag F_ACC_ST is set to a value other than 0. On the other hand, if it is determined that the state has changed, the control flag F_ACC_ST is set to 0. Accessories to be subjected to state determination and details of the accessory state determining process will be described hereinafter. When the process in the step S4 is completed, the foreign substance removing process proceeds to a step S5.

It is determined in the step S5 whether or not the control flag F_ACC_ST has been set to 0 as a result of the determination processing in the step S4, and if it is determined that the control flag F_ACC_ST has been set to 0, which means that the state of the accessory has not changed, the present process proceeds to a step S7. On the other hand, if it is determined that the control flag F_ACC_ST has been set to a value other than 0, which means that the state of the accessory has changed, the present process proceeds to the step S6.

In the step S6, the aforementioned foreign substance removing operation is carried out, and then the present process proceeds to the step S7.

It is determined in the step S7 whether or not the foreign substance removing switch 68 is kept on by a photographer who desires to carry out the foreign substance removing operation in desired timing, the present process returns to the step S6, wherein the foreign substance removing operation is repeatedly carried out. If it is determined in the step S7 that the foreign substance removing switch 68 is off, the process proceeds to a step S8, wherein the camera 100 shifts to a normal camera operation.

Then, the process proceeds to a step S9, wherein it is determined whether or not the power switch has been turned off. If the power switch has not been turned off, the process returns to the step S7, wherein it is determined whether or not the foreign substance removing switch 68 has been kept on. If it is determined in the step S9 that the power switch has been turned off, the process proceeds to a step S10.

In the step S10, an accessory type storing process is executed so as to store the type of the accessory currently mounted on the camera 100. Details of this process will also be described hereinafter. When the process in the step S10 is completed, the main process proceeds to a step S1.

In the step S1, an accessory state storing process is executed so as to store the state of each accessory currently mounted on the camera 100. Details of this process will also be described hereinafter. When the process in the step S11 is completed, the present process proceeds to a step S12. In the step S12, the same foreign substance removing operation as that in the step S6 is carried out, followed by terminating the sequence of processes.

Figure 3:
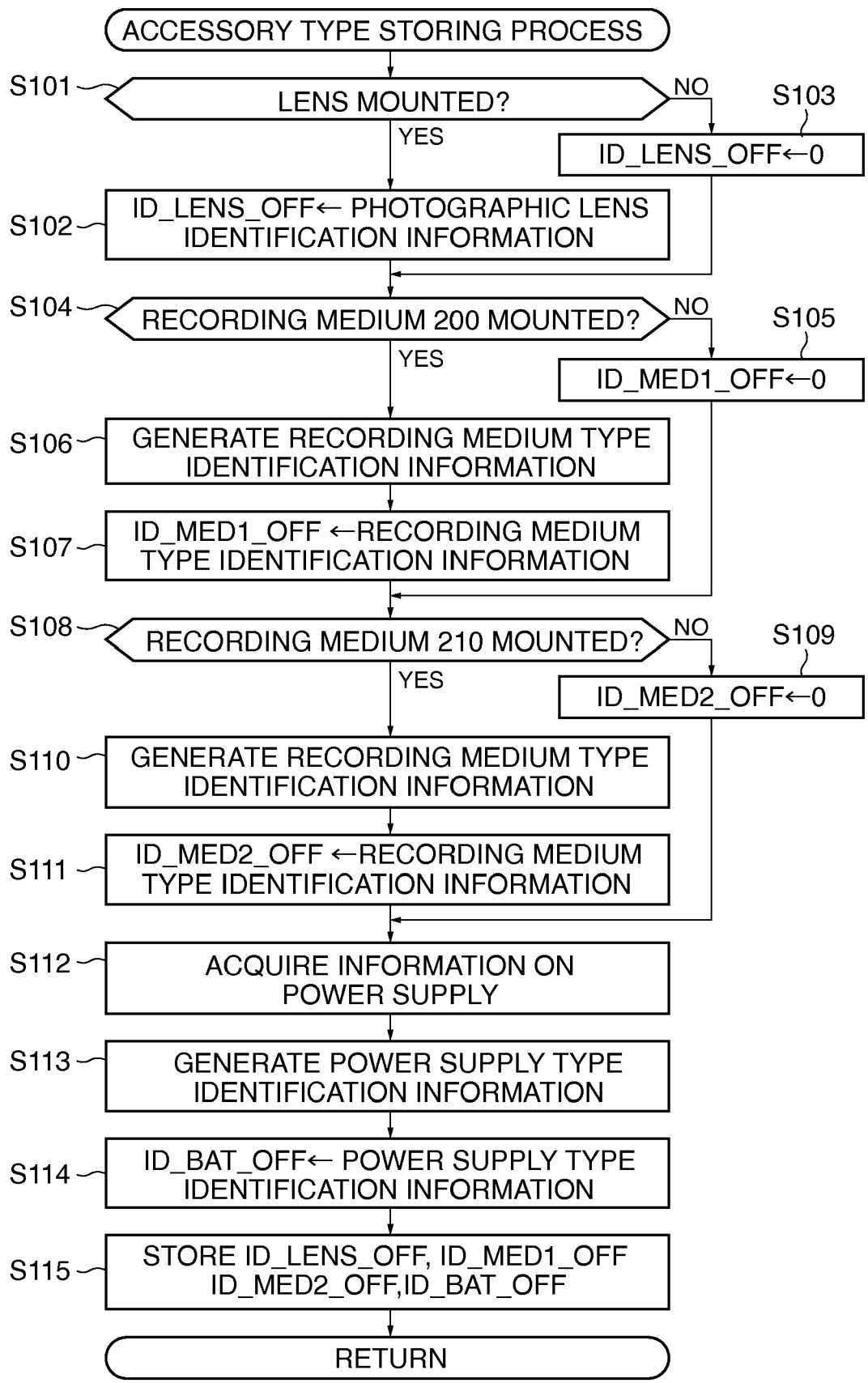
FIG. 3 is a flowchart of an accessory type storing process.

Next, the accessory type storing process executed in the step S10 in FIG. 2 will be described with reference to FIG. 3. FIG. 3 is a flowchart of the accessory type storing process which is executed in the camera 100 according to the embodiment of the present invention.

In the step S10 of the flowchart shown in FIG. 2, a program for carrying out the present process is called and executed. The program for carrying out the process is stored in the memory 52 and is executed under the control of the CPU 50a.

When the present process is started, first in a step S101, it is determined whether or not the photographic lens unit 300 is mounted on the camera 100. If the photographic lens unit 300 is mounted on the camera 100, the process proceeds to a step S102, whereas if not, the process proceeds to a step S103.

Whether or not the photographic lens unit 300 is mounted on the camera 100 is determined by communication between the CPU 50a and the photographic lens unit 300 via the interface 120. If the communication between the CPU 50a and the photographic lens unit 300 is established, it is determined that the photographic lens unit 300 is mounted on the camera 100, whereas if not, it is determined that the photographic lens unit 300 is not mounted on the camera 100. When the photographic lens unit 300 is not mounted on the camera 100, a mount cap is attached to the camera mount 106, in general, to prevent foreign substance from entering the camera 100. In this case as well, communication between the CPU 50a and the photographic lens unit 300 cannot be established, and therefore it is determined that the photographic lens unit 300 is not mounted on the camera 100.

In the step S102, a control flag ID_LENS_OFF is set to identification information of the photographic lens unit 300 stored in the lens system controller 350, and then the process proceeds to a step S104. As the identification information, it is possible to use a model number assigned to each lens type or a serial number uniquely assigned to each individual lens unit.

In the step S103, the control flag ID_LENS_OFF is set to 0, and the process proceeds to the step S104.

In the step S104, it is determined whether or not the recording medium 200 is mounted in the camera 100. If the recording medium 200 is mounted, the process proceeds to a step S106, whereas if not, the process proceeds to a step S105.

In the step S105, a control flag ID_MED1_OFF is set to 0, and the process proceeds to a step S108.

In the step S106, the CPU 50a acquires information concerning the type or model of the recording medium 200, such as an ID number, a model number, and a capacity, and generates recording medium type identification information based on the acquired information. To generate the recording medium type identification information, the information acquired in the step S106 may be used without further processing. However, depending on the type or model of a recording medium, an ID number may not be assigned to the recording medium, for example, and hence acquired information can vary in kind and amount. In such a case, computation using a known algorithm, such as a hash function, may be performed on the acquired information for purposes of simplicity of processing and saving the memory capacity, to thereby generate recording medium type identification information of a fixed bit length. When the processing in the step S106 is completed, the process proceeds to a step S107.

In the step S107, the control flag ID_MED1_OFF is set to the recording medium type identification information generated in the step S106, and the process proceeds to the step S108.

In the step S108 and the following steps S109 to S111, similar processing as described above is performed on the recording medium 210, whereby a control flag ID_MED2_OFF is set to 0 or recording medium type identification information of the recording medium 210, followed by the process proceeding to a step S112.

In the step S112, information concerning the type or model of the power supply 86, such as the classification and ID number of the power supply 86, is acquired, and then the process proceeds to a step S113. The "type of the power supply 86" mentioned here is intended to mean the type of a power supply, including a primary battery, such as an alkali battery and a lithium battery, a secondary battery, such as an NiCd battery and an Li battery, and an AC adapter.

In the step S113, power supply type identification information is generated by the CPU 50a based on the information on the power supply 86 acquired in the step S112. To generate the power supply type identification information, the information acquired in the step S112 may be used without further processing. However, depending on the type or model of a power supply 86, an ID number is not assigned to the power supply 86, for example, and hence acquired information can vary in kind and amount. In such a case, as in the case of generating the recording medium type identification information, computation using a known algorithm, such as a hash function, may be performed on the acquired information for purposes of simplicity of processing and saving the memory capacity, to thereby generate power supply type identification information of a fixed bit length. When the processing in the step S113 is completed, the process proceeds to a step S114.

In the step S114, a control flag ID_BAT OFF is set to the power supply type identification information generated in the step S113, and then the process proceeds to a step S115.

In the step S115, the values of the respective control flags ID_LENS_OFF, ID_MED1_OFF, ID_MED2_OFF, and ID_BAT_OFF are stored in the nonvolatile memory 56, and then the present process as a subroutine is terminated.

Next, the accessory state storing process executed in the step S11 in FIG. 2 will be described with reference to FIG. 4. FIG. 4 is a flowchart of the accessory type storing process which is executed in the camera 100 according to the embodiment of the present invention.

In the step S11 of the flowchart shown in FIG. 2, a program for carrying out the present process is called and executed. The program for carrying out the process is stored in the memory 52 and is executed under the control of the CPU 50a.

When the present process is started, first in a step S201 in FIG. 4, it is determined whether or not the recording medium 200 is mounted in the camera 100. If the recording medium 200 is mounted in the camera 100, the process proceeds to a step S203, whereas if not, the process proceeds to a step S202.

In the step S202, a control flag ST_MED1_OFF is set to 0, and then the process proceeds to a step S205.

In the step S203, the CPU 50a acquires information concerning the state of the recording medium 200, such as a volume label, a folder arrangement, used capacity, and remaining capacity of the recording medium 200, and generates recording medium state identification information based on the acquired information. To generate the recording medium state identification information, the information acquired in the step S203 may be used without further processing. If the acquired information varies in kind and amount, depending on the type or model of a recording medium 200, computation using a known algorithm, such as a hash function, may be performed on the acquired information, as in the above-described accessory type storing process, to thereby generate recording medium state identification information of a fixed bit length. When the processing in the step S203 is completed, the process proceeds to a step S204.

In the step S204, the control flag ST_MED1_OFF is set to the recording medium state identification information generated in the step S203, and then the process proceeds to the step S205.

In the step S205 and the following steps S206 to S208, similar processing as the above-described processing (steps S201 to S204) is performed on the recording medium 210, whereby a control flag ST_MED2_OFF is set to 0 or the recording medium state identification information of the recording medium 210.

In a step S209, information concerning the state of the power supply 86, such as the number of times of execution of battery charging and the voltage level of the power supply 86, is acquired, and then the process proceeds to a step S210.

In the step S210, power supply state identification information is generated based on the information on the power supply 86 acquired in the step S209. To generate the power supply state identification information, the information acquired in the step S209 may be used without further processing. However, If the acquired information varies in kind and amount, i.e. if information on the number of times execution of battery charging is missing, depending on the type or model of a power supply 86, computation using a known algorithm, such as a hash function, may be performed on the acquired information, as in the above-described accessory type storing process, to thereby generate power supply state identification information of a fixed bit length. When the processing in the step S210 is completed, the process proceeds to a step S211.

In the step S211, a control flag ST_BAT_OFF is set to the power supply state identification information generated in the step S210, and then the process proceeds to a step S212.

In the step S212, the values of the respective control flags ST_MED1_OFF, ST_MED2_OFF, and ST_BAT_OFF are stored in the nonvolatile memory 56, and then the present process as a subroutine is terminated.

Figure 5A:
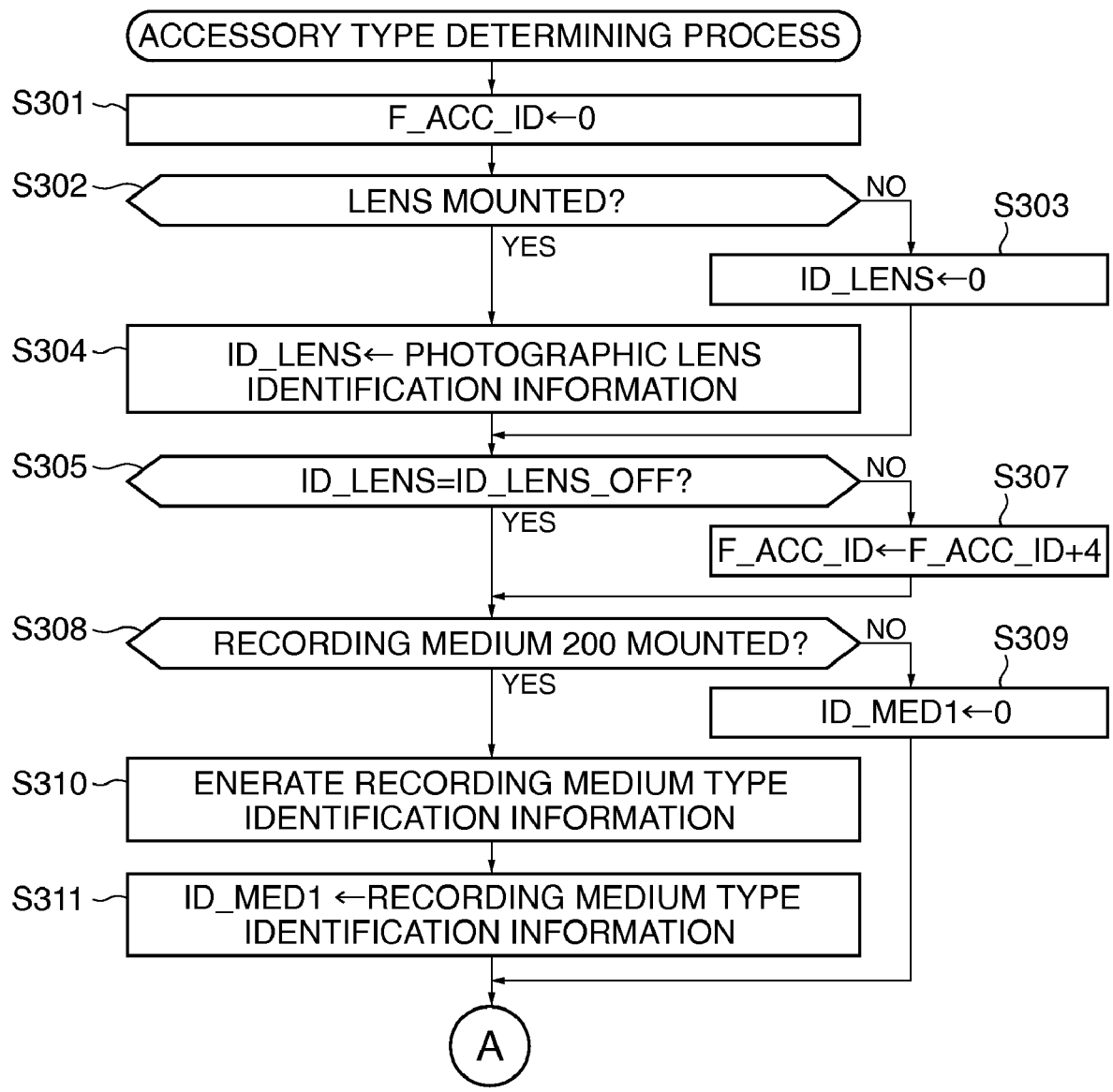
FIG. 5 is a flowchart of an accessory type determining process.
Figure 5B:
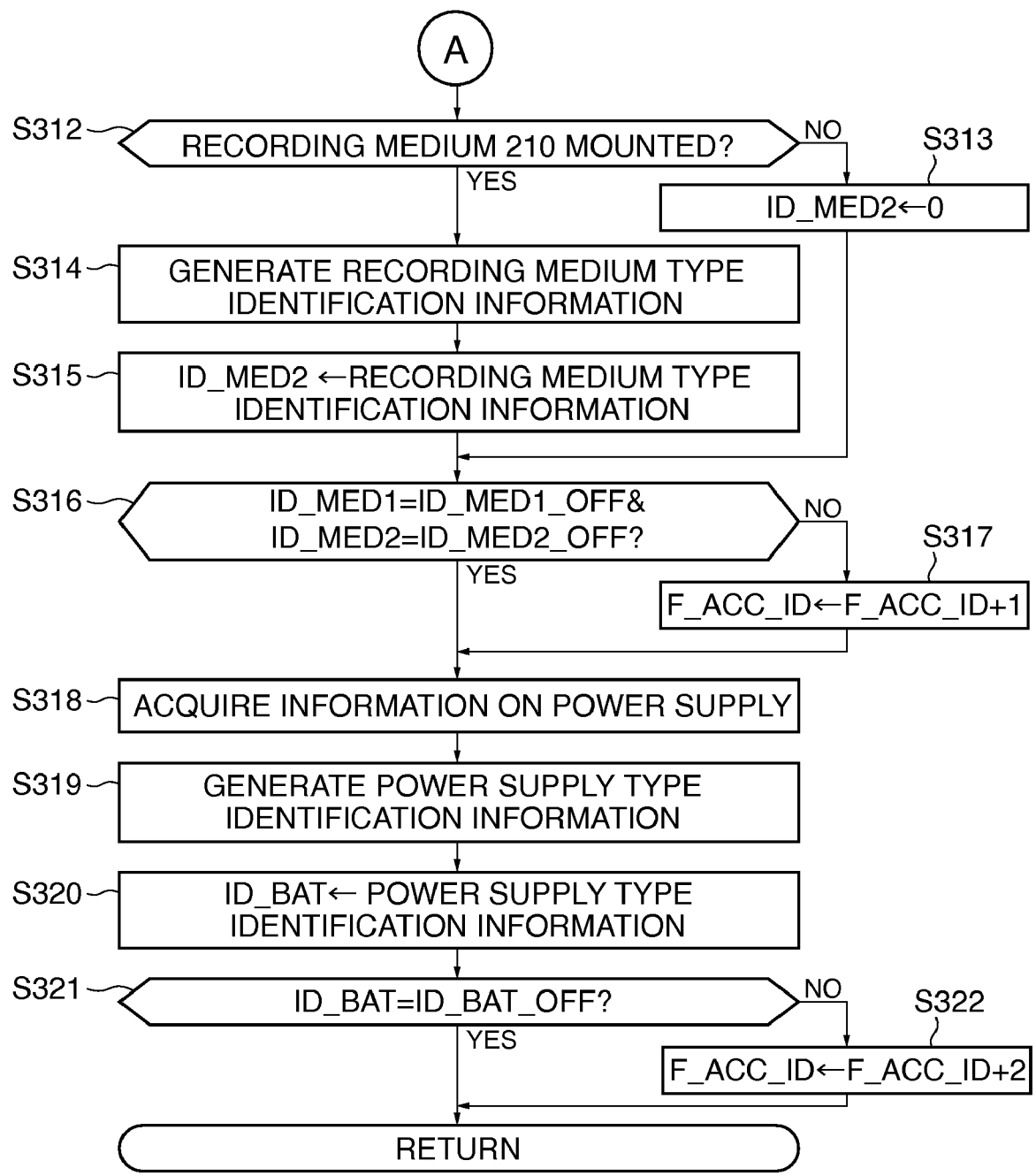

Next, the accessory type determining process executed in the step S2 in FIG. 2 will be described with reference to FIG. 5. FIG. 5 is a flowchart of the accessory type determining process which is executed in the camera 100 according to the embodiment of the present invention.

In the step S2 of the flowchart shown in FIG. 2, a program for carrying out the present process is called and executed. The program for carrying out the process is stored in the memory 52 and is executed under the control of the CPU 50a.

When the present process is started, first in a step S301 in FIG. 5, the control flag F_ACC_ID is reset to 0, and then the process proceeds to a step S302.

In the step S302 and the following steps S303 and S304, similar processing as that carried out in the steps S101 to S103 is executed, whereby a control flag ID_LENS is set to 0 or identification information of the photographic lens unit 300, followed by the process proceeding to a step S305.

In the step S305, discrimination is performed between the value of the control flag ID_LENS and that of the control flag ID_LENS_OFF stored immediately before the preceding power-off. If the two values are equal to each other, the process proceeds to a step S308, whereas if not, the process proceeds to a step S307.

In the step S307, the control flag F_ACC_ID is incremented by 1, and then the process proceeds to the step S308.

In the step S308 and the following steps S309 to S311, similar processing as that in the steps S104 to S107 is carried out, whereby a control flag ID_MED1 is set to 0 or the recording medium type identification information of the recording medium 200.

In the step S312 and the following steps S313 to S315, similar processing as that in the steps S108 to S111 is carried out, whereby a control flag ID_MED2 is set to 0 or the recording medium type identification information of the recording medium 210.

In the step S316, it is determined whether the value of the control flag ID_MED1 is equal to that of the control flag ID_MED1_OFF stored immediately before the preceding power-off, and the value of the control flag ID_MED2 is equal to that of the control flag ID_MED2_OFF stored immediately before the preceding power-off. If the values of the respective control flags ID_MED1 and ID_MED2 are equal to the values of the respective control flags ID_MED1_OFF and ID_MED2_OFF, respectively, the process proceeds to a step S318, whereas if not, the process proceeds to a step S317.

In the step S317, the control flag F_ACC_ID is incremented by 1, and then the process proceeds to the step S318.

In the step S318 and the following steps S319 and S320, similar processing as that in the steps S112 to S114 is carried out, whereby a control flag ID_BAT is set to the power supply type identification information of the power supply 86, followed by the process proceeding to a step S321.

In the step S321, it is determined whether the value of the control flag ID_BAT is equal to that of the control flag ID_BAT_OFF stored immediately before the preceding power-off. If the two values are equal to each other, the present process as a subroutine is terminated, whereas if not, the process proceeds to a step S322.

In the step S322, the control flag F_ACC_ID is incremented by 2, and then the present subroutine is terminated.

When it is determined by the sequential processing of the above-described subroutine that the photographic lens unit 300, the recording media 200 and 210, and the power supply 86 are all identical in type to the respective corresponding ones detected immediately before the preceding power-off, the control flag F_ACC_ID is set to 0. On the other hand, when it is determined that at least one of the photographic lens unit 300, the recording media 200 and 210, and the power supply 86 is not identical in type to the corresponding one detected immediately before the preceding power-off, the control flag F_ACC_ID is set to 1 or larger. In other words, when the control flag F_ACC_ID is equal to 1 or larger, it can be judged that at least one of the photographic lens unit 300, the recording media 200 and 210, and the power supply 86 was replaced after the preceding power-off.

Figure 6A:
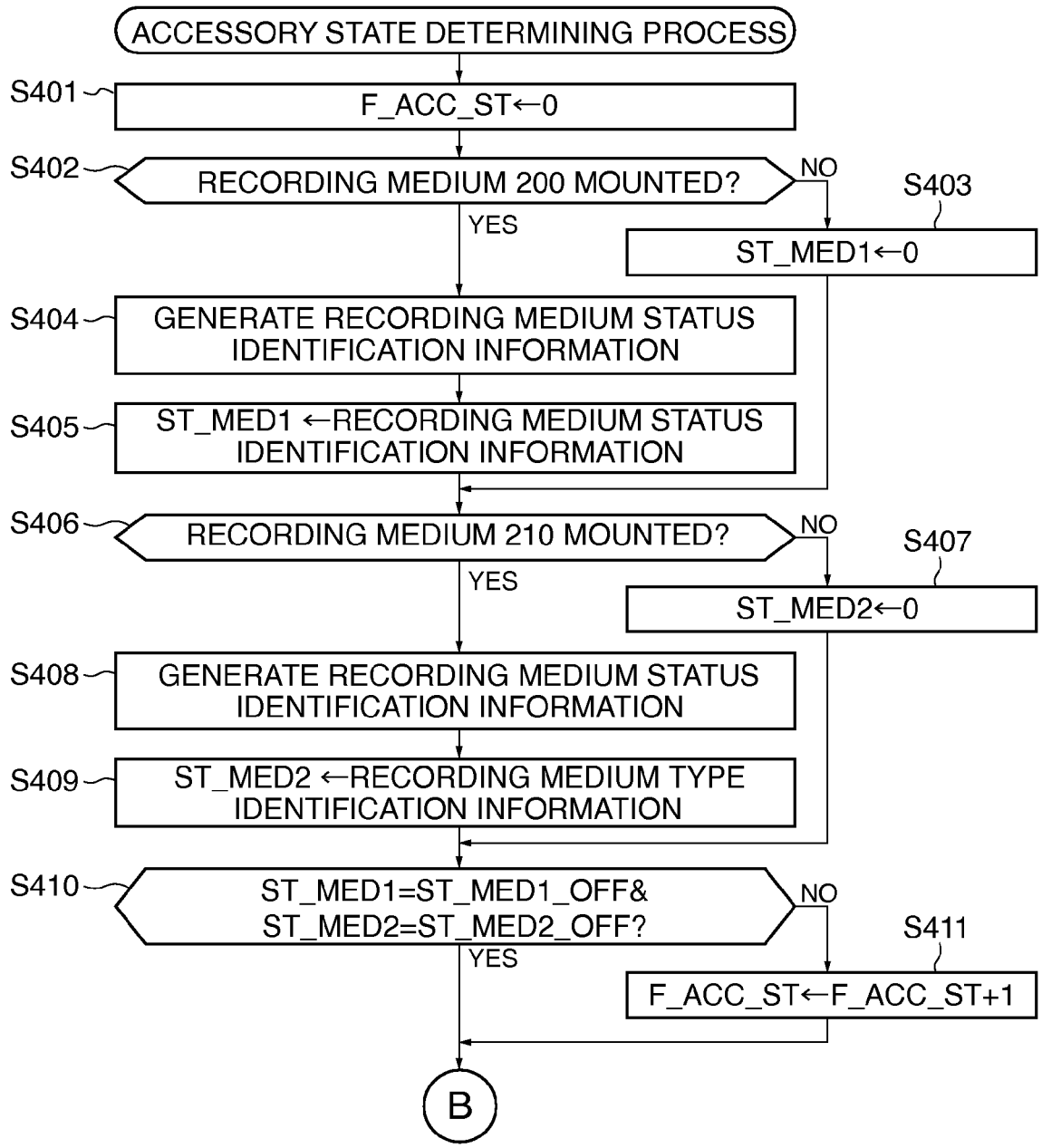
FIG. 6 is a flowchart of an accessory state determining process.
Figure 6B:
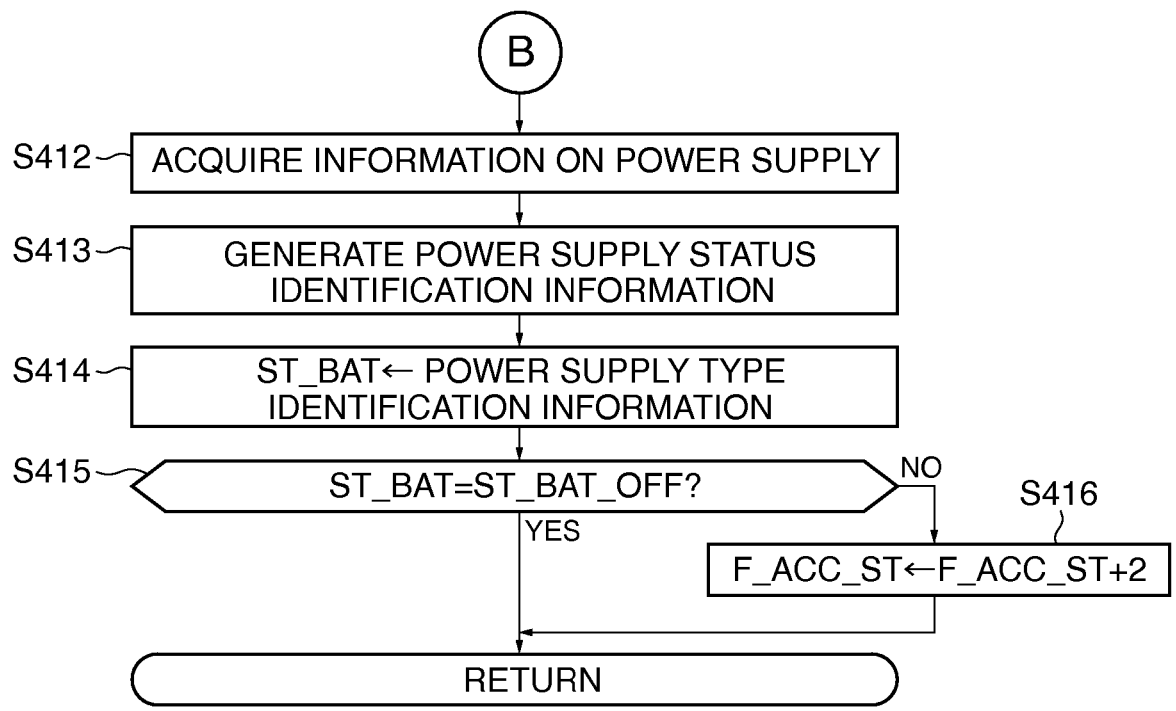

Next, the accessory state determining process executed in the step S4 in FIG. 2 will be described with reference to FIG. 6. FIG. 6 is a flowchart of the accessory type determining process which is executed in the camera 100 according to the embodiment of the present invention.

In the step S4 of the flowchart shown in FIG. 2, a program for carrying out the present process is called and executed. The program is stored in the memory 52 and is executed under the control of the CPU 50a.

When the present process is started, first in a step S401 in FIG. 6, the control flag F_ACC_ST is reset to 0, and then the process proceeds to a step S402.

In the step S402 and the following steps S403 to S405, similar processing as that in the steps S201 to S204 is carried out, whereby a control flag ST_MED1 is set to 0 or the recording medium state identification information of the recording medium 200, followed by the process proceeding to a step S406.

In the step S406 and the following steps S407 to S409, similar processing as that in the steps S205 to S208 is carried out, whereby a control flag ST_MED2 is set to 0 or the recording medium state identification information of the recording medium 210, followed by the process proceeding to a step S410.

In the step S410, it is determined whether the value of the control flag ST_MED1 is equal to that of the control flag ST_MED1_OFF stored immediately before the preceding power-off, and the value of the control flag ST_MED2 is equal to that of the control flag ST_MED2_OFF stored immediately before the preceding power-off. If the values of the respective control flags ST_MED1 and ST_MED2 are equal to the values of the respective control flags ST_MED1_OFF and ST_MED2_OFF, respectively, the process proceeds to a step S412, whereas if not, the process proceeds to a step S411.

In the step S411, the control flag F_ACC_ST is incremented by 1, and then the process proceeds to the step S412.

In the step S412 and the following steps S413 and S414, similar processing as that in the steps S209 to S211 is carried out, whereby a control flag ST_BAT is set to the power supply state identification information of the power supply 86.

In the step S415, it is determined whether the value of the control flag ST_BAT is equal to that of the control flag ST_BAT_OFF stored immediately before the preceding power-off. If the two values are equal to each other, the present process as a subroutine is terminated, whereas if not, the process proceeds to a step S416.

In the step S416, the control flag F_ACC_ST is incremented by 2, and then the present subroutine is terminated.

When it is determined by the sequential processing of the above-described subroutine that each of the recording media 200 and 210, and the power supply 86 is in the same state as its state detected immediately before the preceding power-off, the control flag F_ACC_ST is set to 0. On the other hand, when it is determined that at least one of the recording media 200 and 210, and the power supply 86 is in a different state from its state detected immediately before the preceding power-off, the control flag F_ACC_ST is set to 1 or larger. In other words, when the control flag F_ACC_ST is equal to 1 or larger, it can be judged that at least one of the recording media 200 and 210 and the power supply 86 was taken out from the camera after the preceding power-off and was subjected to processing, such as formatting or charging.

As described above, according to the embodiment of the present invention, when the power of the camera is turned on, the type of each of the power supply 86, the lens unit 300, and the recording media 200 and 210 is compared with that detected immediately before the preceding power-off, and the foreign substance removing operation is performed only when at least one of the power supply 86, the lens unit 300, and the recording media 200 and 210 is different in type from the corresponding one having been mounted immediately before the preceding power-off. Similarly, immediately after the power-on of the camera, the state of each of the power supply 86 and the recording media 200 and 210 is compared with that detected immediately before the preceding power-off, and the foreign substance removing operation is performed only when at least one of the power supply 86, the lens unit 300, and the recording media 200 and 210 is different in state from the corresponding one having been mounted immediately before the preceding power-off.

Therefore, even when accessories are exchanged during the power-off state of the image pickup apparatus, it is possible to remove foreign substance, such as dust, attached to the optical member disposed in front of the image pickup element.

As for the flow of the accessory type determining process and the accessory type storing process, and that of the accessory state determining process and the accessory state storing process, only one of them may be executed, or alternatively, both of them may be sequentially executed. This flow of the processes makes it possible to determine, when the power is turned on, whether or not it is necessary to carry out a foreign substance removing operation, and then execute the foreign substance removing operation based on the result of the determination, so that reduction of start-up time immediately after power-on and prevention of exhaustion of the battery can be achieved.

It is to be understood that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims priority from Japanese Patent Application No. 2006-217457 filed Aug. 9, 2006, which is hereby incorporated by reference herein in its entirety.

What is claimed is:

1. An image pickup apparatus on which and from which an accessory device can be mounted and removed, comprising:
   an optical member disposed in front of an image pickup element on a photographic optical axis;
   a foreign substance removing unit configured to remove foreign substance attached to said optical member;
   an accessory type/state-detecting unit configured to detect at least one of a type and a state of an accessory mounted on the image pickup apparatus, immediately before a power-off of the image pickup apparatus, and detect at least a corresponding one of a type and a state of an accessory mounted on the image pickup apparatus, immediately after a next power-on of the image pickup apparatus;
   a determining unit configured to determine whether the at least one of the type and the state of the accessory mounted on the image pickup apparatus, detected immediately before the power-off by said accessory type/state-detecting unit is identical to or different from the at least the corresponding one of the type and the state of the accessory mounted on the image pickup apparatus, detected immediately after the next power-on by said accessory type/state-detecting unit; and a control unit configured to cause said foreign substance removing unit to operate when said determining unit determines that the at least one of the type and the state of the accessory mounted on the image pickup apparatus, detected immediately before the power-off is different from the at least the corresponding one of the type and the state of the accessory mounted on the image pickup apparatus, detected immediately after the next power-on of the image pickup apparatus.

2. An image pickup apparatus as claimed in claim 1, further comprising a storage unit configured to store information on at least one of the type and the state of the accessory mounted on the image pickup apparatus, detected immediately before the power-off.

3. An image pickup apparatus as claimed in claim 1, wherein the accessory is at least one of an exchangeable photographic lens, an image storing medium for recording a picked-up electronic image, and a power supply.

4. An image pickup apparatus as claimed in claim 2, wherein the accessory is at least one of an exchangeable photographic lens, an image storing medium for recording a picked-up electronic image, and a power supply.

5. A method of controlling an image pickup apparatus on which and from which an accessory device can be mounted and removed, the image pickup apparatus including an optical member disposed in front of an image pickup element on a photographic optical axis, and a foreign substance removing unit configured to remove foreign substance attached to the optical member, comprising:

an accessory type/state-detecting step of detecting at least one of a type and a state of an accessory mounted on the image pickup apparatus, immediately before a power-off of the image pickup apparatus, and detecting at least a corresponding one of a type and a state of an accessory mounted on the image pickup apparatus, immediately after a next power-on of the image pickup apparatus;

a determination step of determining whether the at least one of the type and the state of the accessory mounted on the image pickup apparatus, detected immediately before the preceding power-off in said accessory type/state-detecting step is identical to or different from the at least the corresponding one of the type and the state of the accessory mounted on the image pickup apparatus, detected immediately after the next power-on in said accessory type/state-detecting step; and a control step of causing said foreign substance removing unit to operate when it is determined in said determination step that the at least one of the type and the state of the accessory mounted on the image pickup apparatus, detected immediately before the power-off is different from the at least the corresponding one of the type and the state of the accessory mounted on the image pickup apparatus, detected immediately after the next power-on of the image pickup apparatus.

6. A computer readable storage medium storing a control program for causing a computer to execute a method of controlling an image pickup apparatus on which and from which an accessory device can be mounted and removed, the image pickup apparatus including an optical member disposed in front of an image pickup element on a photographic optical axis, and a foreign substance removing unit configured to remove foreign substance attached to the optical member, comprising:

an accessory type/state-detecting module for detecting at least one of a type and a state of an accessory mounted on the image pickup apparatus, immediately before a power-off of the image pickup apparatus, and detecting at least a corresponding one of a type and a state of an accessory mounted on the image pickup apparatus, immediately after a next power-on of the image pickup apparatus;

a determination module for determining whether the at least one of the type and the state of the accessory mounted on the image pickup apparatus, detected immediately before the power-off by said accessory type/state-detecting module is identical to or different from the at least the corresponding one of the type and the state of the accessory mounted on the image pickup apparatus, detected immediately after the next power-on by said accessory type/state-detecting module; and a control module for causing said foreign substance removing unit to operate when said determination module determines that the at least one of the type and the state of the accessory mounted on the image pickup apparatus, detected immediately before the power-off is different from the at least the corresponding one of the type and the state of the accessory mounted on the image pickup apparatus, detected immediately after the next power-on of the image pickup apparatus.

* * * * *